FIG I

Aug. 6, 1974 R. ZITO, JR 3,827,915
IN A BATTERY, A HALOGEN RETENTION VENT MEANS
Original Filed Feb. 3, 1971 3 Sheets-Sheet 3

United States Patent Office

3,827,915
Patented Aug. 6, 1974

---

3,827,915
IN A BATTERY, A HALOGEN RETENTION
VENT MEANS
Ralph Zito, Jr., Westford, Mass., assignor to The Zito
Company, Inc., Derry, N.H.
Original application Feb. 3, 1971, Ser. No. 112,254, now
Patent No. 3,719,526. Divided and this application Oct.
30, 1972, Ser. No. 302,260
Int. Cl. H01m 1/06
U.S. Cl. 136—179                                    2 Claims

ABSTRACT OF THE DISCLOSURE

Electrode structures for a rechargeable metal halide battery include: a cathodic electrode comprising a halogen-inert electroconductive layer and bonded to one of the major surfaces thereof, a halogen-entrapment structure comprising a halogen-adsorbent layer and a surface layer comprising porous, electrically non-conductive halogen-inert, electrolyte-inert, and halogen non-adsorbent particles, having an average largest dimension less than about 10 mils and a halogen-inert bonding agent bonding the particles together into an integral non-conductive mass which essentially retains the porosity of the particles; and an anodic electrode having a coating of such electrically nonconductive particles on the electroplating surface of the electrode.

---

This is a division of application Ser. No. 112,254 filed Feb. 3, 1971, now U.S. Patent 3,719,526.

This invention relates to metal halide storage batteries and also to similar devices requiring halogen storage systems.

In a rechargeable metal halide storage battery, a metal halide salt, dissolved in a suitable electrolyte, is electrolyzed during charging providing free metal at the anode and molecular halogen at the cathode. If the battery is to retain substantial charge after the charging current is discontinued, the metal and halogen must be stored substantially out of chemical contact with one another, and yet still be accessible on demand when power is to be drawn from the battery. This must be accomplished in a compact battery construction, with a small electrolyte volume, if the battery is to be an economical energy source. Moreover, to have an adequate useful life, the storage system provided must function reliably and without deterioration over repeated charging and discharging cycles.

The object of this invention is to provide compact, reliable and economical metal halide energy sources, such as rechargeable storage batteries, having improved charge retention capacity.

Another object is to provide halogen storage systems for storing halogen in molecular form for substantial periods of time in a medium rendering the halogen substantially instantaneously accessible on demand for electrochemical reaction.

A further object is to provide improved electroplating surfaces for reversibly storing electroplated metals in a medium rendering the electroplated metal substantially instantaneously accessible on demand for electrochemical reaction.

A particular object is to provide improved cathode and anode structures for metal halide batteries which are light weight, simple and economical to produce in mass quantities, and which interact with halogen/halide and metal/metal ions, respectively, in a consistent, reproduceable manner during repeated charging and discharging operations.

Another object is to provide improved rechargeable zinc bromide storage batteries.

The invention features electrode structure for a rechargeable metal halide battery in which a salt of an electroplatable metal and a halogen selected from the class consisting of chlorine, bromine and iodine is electrolyzed from solution in a liquid electrolyte medium during the charging cycle and reformed during the discharging cycle. In one aspect, the invention features electrode structure having improved cathode characteristics comprising a halogen-inert electroconductive layer, substantially impermeable to the electrolyte, and substantially impermeable to the electrolyte, and substantially impermeable to halogen between discharging cycles, which layer has bonded to it along one of its major surfaces, a halogen-entrapment structure, which is permeable to electrolyte, inert to halogen, and comprises a halogen-adsorbent layer adjacent the electroconductive layer, and, at least along and bonded to the major surface of the adsorbent layer (opposite that bonded to the electroconductive layer) a surface layer comprising porous, electrically non-conductive halogen-inert, electrolyte inert, and halogen non-adsorbent particles, having an average largest dimension less than about 10 mils and a halogen-inert bonding agent bonding the particles together into an integral non-conductive mass which essentially retains the porosity of the particles. When the battery is charged, this surface layer retards halogen diffusion out of the adsorbent layer and into the electrolyte, where it could otherwise migrate to and attack the metal electroplated at the anode surface of the battery. The charge storage capacity of the battery is substantially increased over batteries utilizing adsorbent layers alone (of substantially the same thickness). Yet, this added surface layer, being non-reactant with and non-adsorbent of halogen, will not adversely affect the rate at which halogen can recombine with metal in the battery during discharge, thus permitting selected high discharge rates. The halogen will not form at this surface layer in the charge cycle, since the layer is electrically non-conductive, but will form beneath the layer, and hence will not tend to be exposed to the electroplated anode surfaces when the battery is left at full charge. This surface layer is also preferably thin (generally about ⅓ or less of the total thickness of the underlying adsorbent layer), hence permitting close spacing of electrodes, minimal electrolyte volume, and resultant light-weight and compact battery construction.

Where the halogen is bromine, a preferred adsorbent layer comprises bromine-adsorbent activated carbon particles (preferably comprising 90% or more of the total weight of the layer) bonded together into an integral adsorbent mass by a bromine-inert bonding agent, the adsorbent layer having a bromine adsorptivity of at least 0.5 gms, of bromine per gram of adsorbent layer. In a preferred entrapment device having such an adsorbent layer, the surface layer bonded thereto has edge portions of greater thickness than its interior portion, and the edge portions of the adsorbent layer are of correspondingly reduced thicknesses, so that the exposed cathode surface of the surface layer may be flat. This edge construction assures that the major adsorbent surfaces will be fully covered by the surface layer, further improving the charge retention capacity of the battery. In such constructions, a preferred thickness for the thinner interior portion of the surface layer is about 10 to 30 mils.

In another aspect, the invention features electrode structure, having improved anode characteristics, comprising a halogen-inert electroconductive member substantially impermeable to said liquid medium, substantially inert to halogen at least between discharging cycles, and which has an exposed surface, adapted to be arranged as a metal electroplating surface, to which is firmly bonded a coating of the aforesaid non-conductive particles of a thickness sufficient to substantially cover the exposed surface. It has been found that such an electroplating surface results in a more consistent open circuit voltage at successive charging cycles, indicating a smoother, more uniform, and stronger electroplate deposit. The discharge cycle is also found to be steady, smooth and predictable. It is believed that the electrical non-conductivity of the coating causes metal to commence plating at the interface of the electroconductive layer and the coating, and hence well within the coating itself. Subsequent metal layer growth being within and through this coating, including within the porous interiors of the particles, the electroplated metal layer has strength and integrity. Further, since substantial portions of this electroplate are somewhat isolated from whatever free halogen may be in the electrolyte, corrosion or dissolution of the electroplate during storage of the battery in a charged condition is considerably impeded. The uniformity of the electroplate deposit over the entire electroplating surface further discourages the growth of metal dendrites through the electrolyte which, upon reaching electrolytic cathode surfaces, can cause discharge in or even short-circuit of the battery. In preferred embodiments, this coating is about 5 to 20 mils thick.

In the preferred anodic and cathodic structures, the electroconductive layer or member comprises highly electroconductive carbon particles (e.g., graphite) bonded together into an integral electroconductive mass by a bonding agent substantially inert to bromine and to the electrolyte, the mass being preferably 25% to 75% carbon particles by weight.

Other objects, features and advantages will appear to one skilled in the art from the following description of a preferred embodiment of the invention taken together with the attached drawings thereof, in which.

Figure 3:
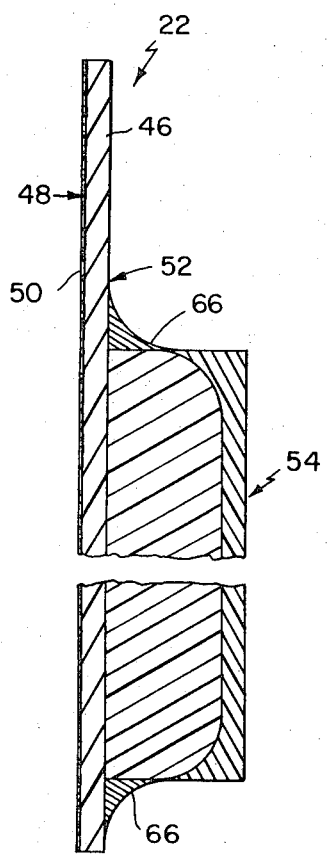
FIG. 3 is a sectional view of a composite or intermediate electrode constructed in accordance with the present invention.

FIGS. 7a, 8a, 9a and 10a are plan views of electrode structures useful in forming the electrode shown in FIG. 3; and FIGS. 7b, 8b, 9b and 10b are sectional views of the electrode structures of FIGS. 7a, 8a, 9a and 10a, respectively.

Figure 1:
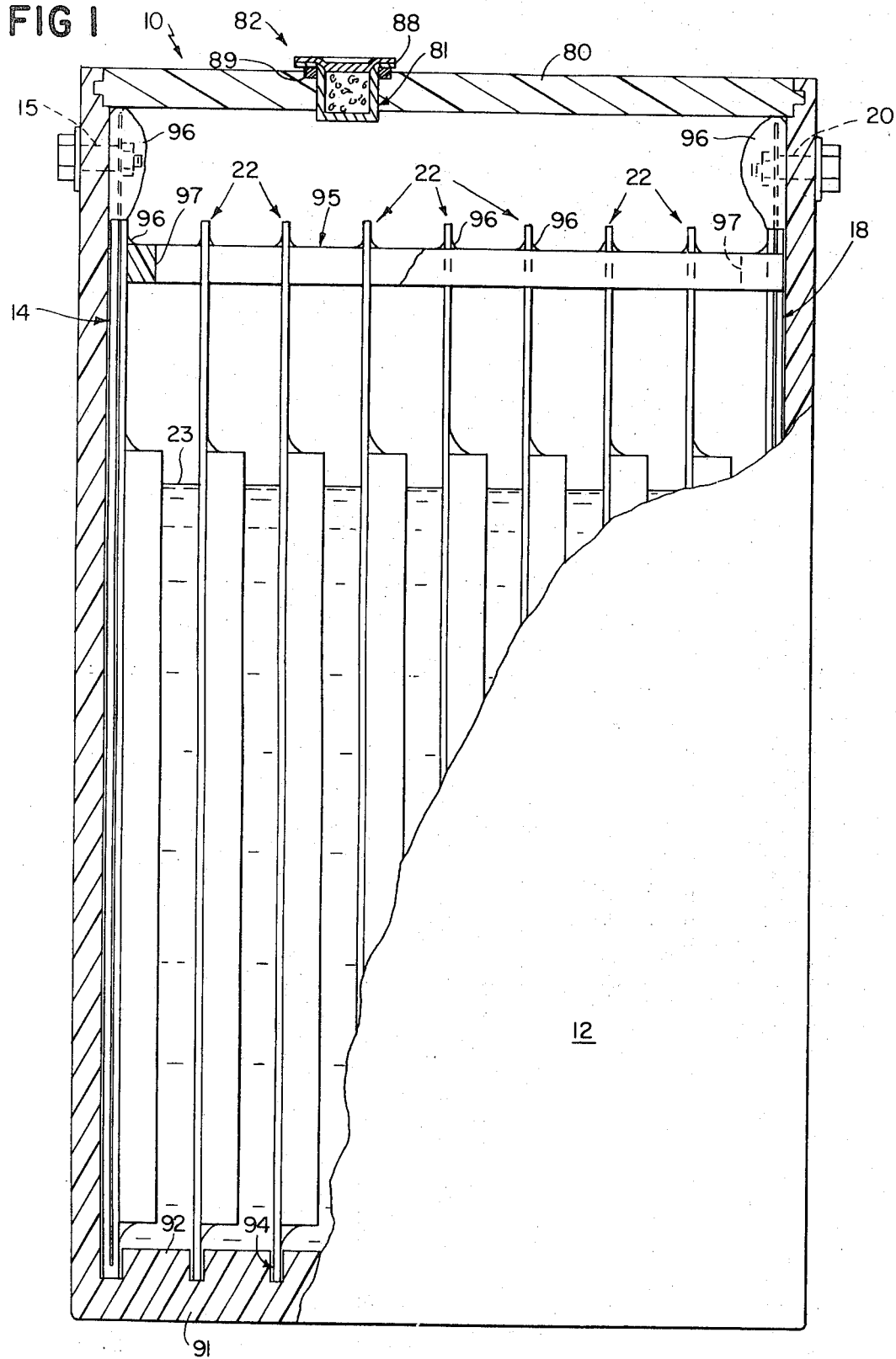
FIG. 1 is a plan view of a metal halide battery embodying the present invention, with the forward side of the battery housing partially broken away.

FIG. 1 shows a zinc bromide battery 10 encased in a polyethylene housing 12, of which the forward side has been partially broken away to expose the interior of the battery. The battery has a terminal cathode 14 electrically connected to a cathode terminal screw 15 which extends through the housing 12, a terminal anode 18 at its other end which is electrically connected to an anode terminal screw 20 which also extends through the housing 12, and a plurality (7) of intermediate or composite electrodes 22, all arranged generally in parallel and spaced apart from one another. A liquid electrolyte medium 23 consists of an aqueous solution which is 0.5 to 7 molar zinc bromide, .01 molar aluminum chloride, and .005 molar aluminum potassium aluminum sulfate (the aluminum salts being brightener additives). This battery is about 14 volts, and has a capacity of over 20 amp/hour at full charge.

Figure 2:
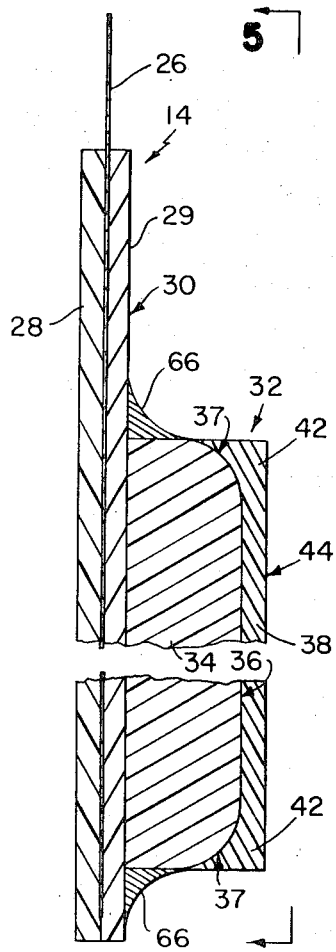
FIG. 2 is a sectional view of a terminal cathode constructed in accordance with the present invention.
Figure 5:
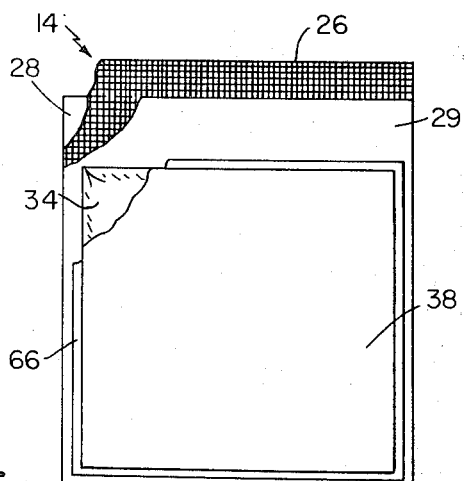
FIG. 5 is a plan view, partially broken away, of the cathode of FIG. 2.

Referring to FIGS. 2 and 5, the terminal cathode 14 has a copper screen 26, the major portion of which is sandwiched between two bromine-inert and bromine-impermeable electro-conductive layers 28, 29, each of which is formed of a 50—50 by weight mixture of electroconductive graphite particles bonded together by poly (vinylidene fluoride) ("Kynar") particles, the graphite and bonding agent being bonded together under heat and pressure to form an integral electroconductive layer. Each layer 28, 29 is capable of conducting electricity across its thickness from its exposed face through copper screen 26 and has a thickness of about 25 mils. The layers 28, 29 are bonded to one another through the openings in copper screen 26.

Firmly secured to the exposed face 30 of layer 29, which has an exposed surface area of about 120 (10 in. x 12 in.) square inches is a bromine entrapment structure 32, which consists of an interior bromine adsorbent layer 34 and a surface layer 38 firmly secured to the front exposed face 36 of adsorbent layer 34. Adsorbent layer 34 is formed of at least about 90% by weight of bromine adsorbent activated carbon particles, and the remainder of a polyethylene bonding agent effective to bond the carbon particles into an integral adsorbent mass. The layer 34 has a thickness on the order of about 120 mils over most of its area, and a somewhat reduced thickness at its edges 37.

Surface layer 38 is about 30 mils thick over most of its area, and of somewhat greater thickness at its edges 42, and is formed of at least about 90% by weight of electrically non-conductive particles bonded together into an integral non-conductive mass by a polyethylene bonding agent. The particles are porous, inert to halogen and electrolyte, and do not adsorb halogen. The edges 37 of adsorbent layer 34 are rounded around the entire periphery of the layer, and the edges 42 of the surface layer 38 are sized so that the bromine entrapment device 32 will have a rectangular cross section in all three perpendicular planes, presenting a flat extended cathode surface 44 to the electrolyte.

Each composite electrode 22, shown in FIG. 3, has a single electroconductive layer 46, identical to either of layers 28 and 29 of terminal cathode 14, and approximately 25 mils thick. A thin coating 50 (on the order of 10 mils) of the above-described electrically non-conductive particles is bonded to the exposed anode surface 48 of plastic layer 46. These particles are bonded directly to the poly (vinylidene fluoride) bonding agent of electroconductive layer 46. Secured to the opposite surface 52 of electroconductive layer 46 is a bromine entrapment structure 54 identical to the bromine entrapment structure 32 of terminal cathode 14.

Figure 4:
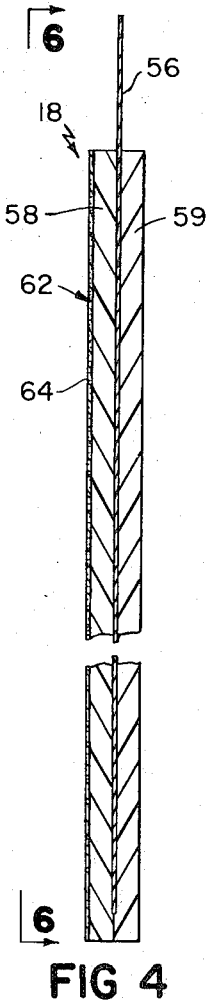
FIG. 4 is a sectional view of a terminal anode constructed in accordance with the present invention (or used in the battery of FIG. 1)
Figure 6:
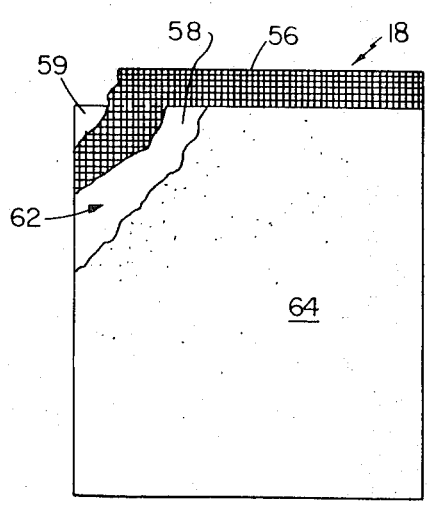
FIG. 6 is a plan view, partially broken away, of the terminal anode of FIG. 4.
Figure 7A:
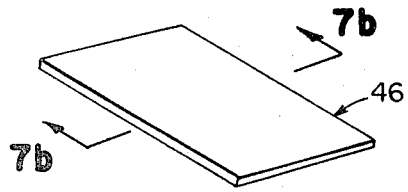
Figure 7B:
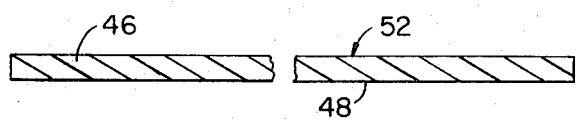

Referring to FIGS. 4 and 6, terminal anode 18 has a copper screen 56, identical to copper screen 26 of terminal cathode 14, the major portion of which is sandwiched between two bromine inert and bromine impermeable electroconductive layers 58, 59, which are identical to the electroconductive layers 28, 29 of terminal cathode 14 and are identically bonded to one another through the openings of screen 56. The exposed anode face 62 of electroconductive layer 58 has a thin coating 64 of the above-described electrically non-conductive particles identical to the coating 50 on the anode face 48 of composite electrode 22. Exposed portions of the electroconductive layers, and bromine adsorbent layers are coated with a thin coating 66 of a bromine-inert and gas-permeable sealer, such as the silicon rubber sealer available from General Electric Company under the trade name "RTV."

Although the battery shown in FIG. 1 is electrically tapped as shown only at the terminal electrodes 14 and 16, it will be understood that lesser voltage may be tapped by providing intermediate terminal-type electrodes. Such electrodes would be identical to terminal cathode 14, except for the presence of a thin coating of electrically non-conductive particles on the exposed major surface of the electroconductive layer 28, identical to the coatings 50, 64 on composite electrode 22 and terminal anode 18, respectively.

The battery housing 12 has in its cover 80 an opening 81, sized to receive a generally cylindrical gas escape cap 82 which seals the interior of the battery. As shown in FIG. 1, cap 82 is formed of a gas-permeable (but liquid and solid-impermeable) and bromine-inert material, such as polyethylene. The cap is at least partially filled with a material which will remove bromine from gases coming from the battery through the interior cap wall, but not other gases, such as oxygen and hydrogen. Finely-divided zinc filings is a suitable such material, as is particulate activated carbon. The vent cap 82 is sized to fit in a tight seal into opening 81 and has a flange 88 which with sealing gasket 89, provides a gas tight seal between the cap 82 and the cover 80. Since the gas escape cap is gas-permeable, but at least its interior wall is liquid-impermeable, hydrogen and oxygen gases evolved in small quantities during operation of the battery (but not bromine or liquid) will escape through the exterior cap wall to the atmosphere.

The bottom wall 91 of housing 12 has a number of upstanding ribs 92, defining therebetween grooves 94. A spacer 95 has the electroductive layers protruding therethrough, and sealed therein by a bromine-inert, and bromine, and liquid-impermeable epoxy resin 96. The spacer 95 has an elongated opening 97 (about 1 inch wide) for filling the battery. Screens 26, 56 and screws 15, 20 are also potted, as shown, in resin 96.

When the electrodes are secured in place, the battery is filled with electrolyte solution by vacuum impregnation, so that the bromine-adsorbent device becomes saturated with electrolyte all the way in to the electroconductive (graphite-fluorocarbon) layers. The battery is charged in the usual manner across the terminal screws 15, 20, electrolyzing the zinc bromide salt to form molecular bromine which is adsorbed by the activated carbon of the cathode and metallic zinc, which is electroplated onto the anode surfaces. During the discharge cycle, the opposite electrochemical reaction takes place, the molecular bromine returning to bromide ion and the zinc plating dissolving to zinc ions.

Although the electrochemical system illustrated is the zinc bromide system, the illustrated electrode structures may be suitable for use with other metal halide systems, where the halogen is chlorine or iodine, or the metal is other than zinc. Among the other metals which are reversibly electro-platable, and form water-soluble metal halide salts are nickel, cadmium, tin, lead and copper. In a non-aqueous electrolyte medium, such as might be utilized for chlorine, the list of metals might also include sodium, potassium and lithium. Of these systems, the zinc bromide system has the advantages of providing a reasonably high potential (1.83 volts), using a very soluble salt which provides a low resistivity electrolyte, and having a calculated free energy per pound of about 200 watt/hours. The molarity of a zinc bromide electrolyte during charging and discharging is preferably between about 0.5 and 7. The electrolyte also may contain a brightener to improve zinc electroplating.

Among preferred particles for forming the cathode surface layers and anode coatings are those commonly used as filter materials or filter aids such as diatomaceous earth, molecular sieves, zeolites and the like. These particles are characterized by a high water absorptivity, typically more than two times their weight, and an electrical resistivity on the order of $10^{10}$ ohm-cm. or even greater.

A particularly preferred material is a flux-calcined diatomaceous earth available from Johns-Manville Company under the trade name "Celite 560."

The pore size of the particles must be large enough to permit diffusion of electrolyte therethrough but small enough to at least substantially retard diffusion of molecular bromine. Preferred particle layers are composed of particles, the pores of which have an average effective diameter less than about one micron, and preferably lower, down to "molecular size."

The size of the non-conductive particles is chosen to provide surface layers at least several particles thick. It is preferred that substantially all of the particles have a largest dimension less than 10 microns. Particles which pass a 100 mesh screen are preferred (the aforesaid "Celite 560" particles so passing, but being 6070 retained on a 150 mesh screen). Particles in the micron range and below are also useful, so long as the particles are not so small as to be occluded by the bonding agent used. It is preferred that the absorptivity of the surface layer be essentially that of the particles themselves, with the amount of bonding agent being that barely sufficient to provide an integral layer. Preferably, the surface layer is at least about 90% by weight of the particles, and no more than about 10% by weight of bonding agent.

The bonding agent in the surface layer must be adherable to that in the adsorbent layer, and, preferably, is identical thereto. Useful bonding agents include polyfluorocarbons, such as polytetrafluoroethylene ("Teflon," available from E. I. du Pont de Nemours & Co.), poly (vinylidene fluoride) ("Kynar," available from Penwalt Co.), polymonochlorotrifluoroethylene ("CTFE," available from Allied Chemical Co.), and "FEP," a fluorinated polyethylene available from the same Du Pont; poly (vinyl chloride) homopolymers (plasticized or unplasticized) (e.g., "Geon 222," available from B. F. Goodrich Co.); poly (vinylidene chloride) homopolymers and copolymers (50% or greater vinylidene chloride) such as acrylonitrile and vinyl chloride copolymers (available generally under the trade name "Saran" from Dow Chemical Co.); polymethacrylates such as poly (methyl methacrylates) ("Plexiglas," available from Rohm & Haas Co.); and polyalkylenes such as polyethylene and polypropylene. The polyalkylenes are presently preferred for the adsorbent layer—because of their low working temperatures, inertness to bromine, and availability at low cost.

The anode coating may be simply electrically non-conductive particles as described pressed into and bound to the preformed electroconductive member.

A thicker layer, having a thickness on the order of that of the surface layer of the cathode is also useful. For forming such a layer, a polyalkylene bonding agent is preferred, and the mixture of polyalkylene is bonded to the already pressed and bonded particle coating, in the same manner as hereinafter described for adhering the adsorbent layer to a base electroconductive layer with reference to FIGS. 8a, 8b, 9a, and 9b.

In addition to the illustrated poly (vinylidene fluoride) bonding agent for the electroconductive layers of the composite electrodes 22, and the illustrated polyethylene bonding agent in the various adsorbent layers, other bonding agents or mixtures of bonding agents may be substituted therefor.

Figure 8A:
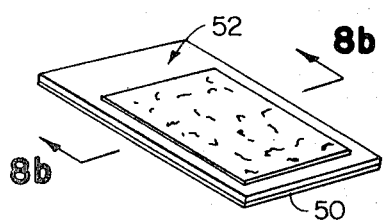
Figure 8B:
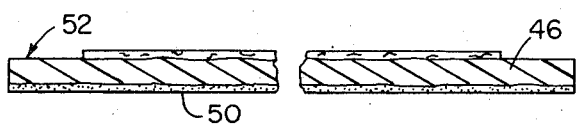

Materials suitable for forming such layers are set forth in the applicant's copending U.S. patent applications: Ser. No. 867,799, filed Oct. 20, 1969, entitled "Battery"; and, Ser. No. 872,993, filed Oct. 31, 1969, entitled "Metal Halide Battery" to which reference is made for details of selection of bonding agents. Another useful bonding agent system is the mixture of a polyfluorocarbon with a minor amount of a polyethylene or polypropylene, such as disclosed in the assignee's copending U.S. patent application, entitled "Electroconductive Composition," Ser. No. 109,156, filed Jan. 25, 1971, now abandoned, in the names of Ralph Zito, Jr., and Edward M. Russell. Where such a mixture is used, bonding of the polyfluorocarbon-bonded electroconductive layers to the polyethylene-bonded activated carbon layer is simpler. For example, it is possible, but not necessarily preferable, to eliminate the step of adhering a thin activated carbon layer, as shown in FIGS. 8a, 8b, to the electroconductive layer prior to forming the bromine-adsorbent device.

Where the electroconductive layer is to be part of a terminal anode or terminal cathode having a bromine-corrodible screen, the bonding agent may be any of those previously set forth for the composite electrodes, except the bromine-permeable polyethylene and polypropylene. Where bromine-degradable polymers, such as vinyl chloride and vinylidene chloride are employed, in electroconductive layers, whether in composite or terminal electrodes, the maximum bromine concentration at the electroconductive layers should not exceed about 0.5 M.

Whether the composition of the various electrodes, each electrode should have a total interface resistance, per square inch of the cross-sectional electrolyte-contacting surface area, not greater than about 0.05 ohms. In addition, each electroconductive layer 28, 29, 46, 58, 59 should have a volume resistivity, $\rho$, such that $\rho d$ is not greater than about 0.1 ohm-in.$^2$, where $d$ is the thickness of the electroconductive layer.

For terminal electrodes, the electroconductive layer which is not exposed to the remainder of the battery (the layer 28, for example, of terminal cathode 14, need not contain any electroconductive carbon particles, but may be simply a sheet of the identical bonding agents used in the electroconductive layer to which it is secured through the copper screen.

FIGS. 7–10 show a method for making the electrodes 14, 18, 22, the method for forming the composite electrode 22 being used as a particular illustration. The electroconductive layer 46 shown in FIGS. 7a and 7b is formed by mixing together 50 grams of poly (vinylidene fluoride) (Pennwalt "Kynar 301") with 50 grams of highly electroconductive graphite particles (Dixon No. 1112). This mixture is introduced into a 10 inch x 12 inch frame and trowelled until level. The frame is placed in a mold formed of two platens, which are then heated to 450° for one minute without pressure, and then are pressed at 500 p.s.i. and 450° F. for three more minutes. The frame is then transferred to platens at room temperature and cooled between those platens under 500 p.s.i. for two more minutes. The resultant layer is about 25 mils thick. Where a terminal anode 18 or a terminal cathode 14 is to be made, two such layers 46 are provided. A copper screen is placed between the two electroconductive layers, with a portion of the screen protruding for making ultimate electrical connection thereto, and the layers and screen are placed between platens, and heated for one minute without pressure at 450° F. and for two more minutes at 500 p.s.i. and 450° F., transferred to platens at room temperature, and cooled for two minutes between these platens at 500 p.s.i.

Referring to FIGS. 8a and 8b, there is spread in the bottom of a frame as described above a thin layer (about 10 mils) of "Celite 560," a flux calcined diatomaceous earth available from Johns Manville Company which has a dry density of 19.5 pounds per cubic foot, a particle size such that all of the particles pass a 100 mesh screen and 60% of the particles by weight are retained by a 150 mesh screen and a water absorption of about 220% by weight. These particles have pores with effective diameters less than 1 micron. The electroconductive layer 46 is placed in the frame on top of the Celite layer, and there is spread onto the other exposed major surface of the electroconductive layer 46 a thin layer (about 2 grams), confined within a frame enclosing a 9 in. x 9 in. area, of activated carbon particles (Barneby Cheney UU Grade). The 9 in. x 9 in. frame is removed, and the Celite-electroconductive layer-activated carbon is placed between two platens, heated to 375° F. for one minute without pressure, compressed between the platens at 375° F. and 400 p.s.i. for two minutes, transferred to platens at room temperature and cooled for two minutes between these platens at 400 p.s.i. Both surfaces of the resultant sheet are then scrubbed with a conventional stiff scrubbing brush to remove non-bonded activated carbon and Celite particles. The 375° temperature having been sufficient to soften slightly the poly (vinylidene fluoride) binder of the electroconductive layer without affecting the basic shape and form of the layer, the Celite and activated carbon particles are bonded to opposite sides of the layer by the poly (vinylidene fluoride) bonding agent, forming the integral electrode structure shown in FIGS. 8a and 8b.

Figure 9A:
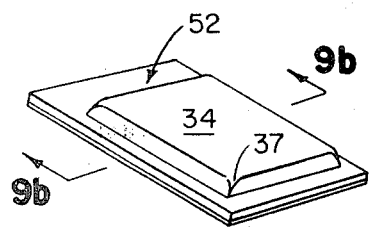
Figure 9B:
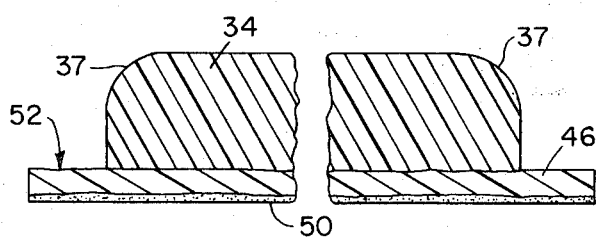

Onto the activated carbon surface of this electroconductive structure is trowelled, within the 9 in. x 9 in. frame, a mixture consisting of 72 grams by weight of the aforesaid activated carbon and about 3.6 grams by weight of polyethylene particles ("FN–510" powder, available from U.S. Indus. Chem. Co.), this mixture having been previously ball milled for fourteen minutes. The mixture is trowelled in such a manner as to leave rounded surfaces around the edges of the activated carbon layer, so that the top surface has an area of about 8¾ in. x 8¾ in., the cross-sectional area of the activated carbon gradually increases to about 9 in. x 9 in. about half way down the total thickness of the layer (about 60 mils down from the top surface). This electrode structure is shown in FIGS. 9a and 9b.

Figure 10A:
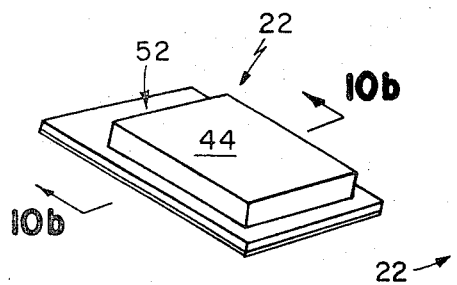
Figure 10B:
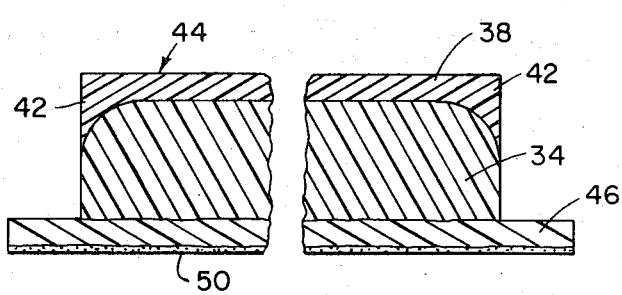

There is trowelled onto this activated carbon-polyethylene mixture within the 9 in. x 9 in. frame a mixture consisting of 32.4 grams of the aforesaid "Celite 560" and 3.6 grams of the aforesaid polyethylene. The Celite mixture is trowelled in such a manner as to fill the edge portions of the activated carbon layer of FIGS. 9a, 9b, to provide, as shown in FIGS. 10a, 10b, a composite activated carbon Celite layer of rectangular cross-section. The entire composite of FIGS. 10a, 10b is placed between plantens, heated to 300° F. for 7 minutes, pressed at 75 p.s.i. and 300° F. for 7 minutes, transferred to platens at room temperature, and cooled at 75 p.s.i. for 7 minutes. The resulting surface (Celite) layer retains essentially the porosity of the individual particles. The interior portion (exclusive of the edges) of the activated carbon is about 125 mils thick, and the interior portion (exclusive of the edges) of the Celite layer is about 30 mils thick.

Other embodiments will occur to one skilled in the art and are within the following claims.

What is claimed is:

1. In a rechargeable metal halide battery in which a salt of an electroplatable metal and a halogen selected from the class consisting of chlorine, bromine and iodine is electrolyzed from solution in a liquid electrolyte medium during the charging cycle and reformed during the discharging cycle, gas escape means comprising a liquid-impermeable, gas-permeable first barrier arranged to seal the interior of said battery, a gas-permeable second barrier spaced from said first barrier and arranged exterior of said first barrier, and a halogen-retention substance disposed between said barriers for retaining halogen passing from the interior of said battery through said first barrier.

2. The battery of claim 1 wherein said halogen retention substance comprises zinc.

References Cited

UNITED STATES PATENTS

| | | | |
|---|---|---|---|
| 3,682,703 | 8/1972 | Smith | 136—155 |
| 1,505,939 | 8/1924 | Batchelor | 136—179 |
| 2,615,062 | 10/1952 | Craig | 136—179 |
| 3,285,781 | 11/1966 | Zito | 136—6 R |

ALLEN B. CURTIS, Primary Examiner

H. A. FEELEY, Assistant Examiner